L. McCORMICK.
METHOD OR ART OF DISPLAYING PICTURES.
APPLICATION FILED SEPT. 20, 1915.
1,260,221. Patented Mar. 19, 1918.
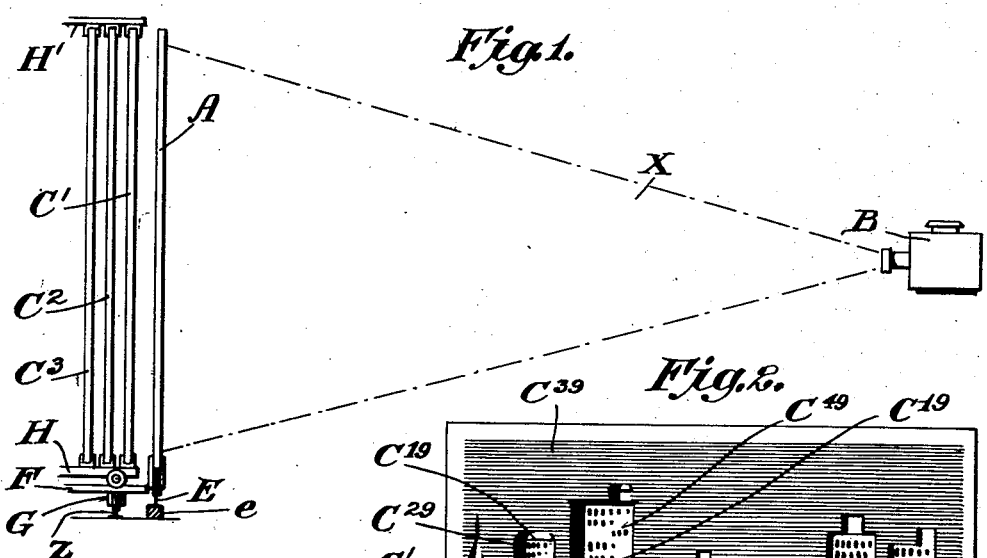
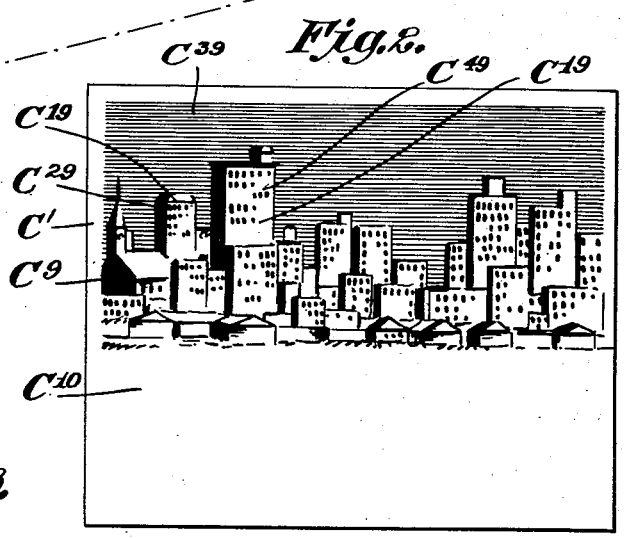
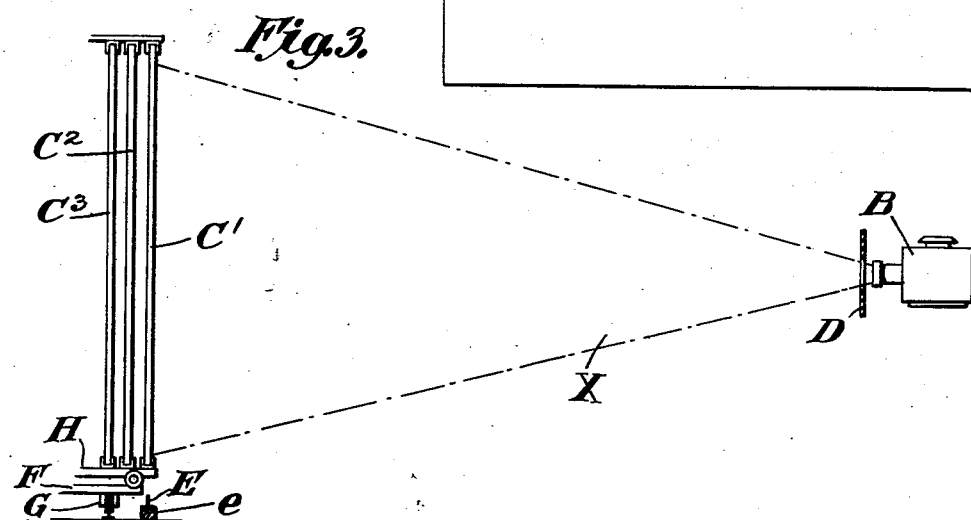
Attest:
Inventor:
LANGDON McCORMICK
by
Atty

UNITED STATES PATENT OFFICE.

LANGDON McCORMICK, OF NEW YORK, N. Y.

METHOD OR ART OF DISPLAYING PICTURES.

1,260,221.  Specification of Letters Patent.  Patented Mar. 19, 1918.

Application filed September 20, 1915. Serial No. 51,708.

*To all whom it may concern:*

Be it known that I, LANGDON McCORMICK, a citizen of the United States of America, residing in the city, county, and State of New York, have invented a new and useful Method or Art of Displaying Pictures; and I do hereby declare the following to be a full, clear, and exact description of the same.

The present invention relates, especially, to improvements in methods of displaying pictures, particularly consecutive-view or moving pictures which are usually projected onto a surface, called a screen, by the aid of light passing through a movable film bearing a succession of pictures.

Prior to my inventions, of which the present is one, it was the practice to modify the appearance (by change of color, etc.,) of the projected pictures, only coloring the film wholly or partly or by interposing a colored transparent shutter between the projecting machine and the screen. My improvements differ from such prior practices, in employing a screen having an exhibition surface provided with a distinct or distinctive portion (or portions) which will modify a picture when projected thereon by merging with the picture.

The accompanying drawing illustrates, diagrammatically, a means and a combination of devices for carrying out my new method.

Figure 1 shows the projection of a picture directly onto the usual first or ordinary screen; Fig. 2 is a plan view of a supplementary screen or other screen provided with distinctive portions; and Fig. 3 shows the projection of a picture directly onto a screen of the kind illustrated in Fig. 2.

Referring to Fig. 1, B indicates a projecting machine of any suitable construction, for throwing the light X onto the exhibition surface of a screen A.

The screen A may be used, as long as desired, for the exhibition of pictures, in any of the usual ways. That screen may be readily moved from position; it is shown as adapted to be quickly slid, crosswise of the hall, along a rail, E, which is secured to a strip, *e*.

The screen heretofore ordinarily used for picture exhibition has usually had a surface, treated or untreated, so as not to modify or affect the appearance of a picture projected thereon.

Departing from such practice, I intentionally employ a screen having its exhibition-surface more or less modified, and cause the picture projected thereon to merge with the modified portion or portions of the exhibition-surface, with the result that the appearance of the projected picture is changed in a manner predetermined at the time the exhibition-surface was modified.

As the modified screen is usually employed in addition to the usual screen (A), I have hereinafter sometimes designated the modified screen as a "supplemental" screen.

In Figs. 1 and 3, I show a plurality of supplemental screens, $C'$, $C^2$, $C^3$. Each of the supplemental screens has its exhibition-surface modified in some manner. The modification may be assured by working upon or in the original surface, by photographing or by printing on the screen, by cutting, or by removing part of the screen, or by painting or otherwise applying material. As an instance, considering Fig. 2, this shows a supplemental or other screen $C'$ having a modified area, $C^9$, and an unmodified area $C^{10}$. The modified area, $C^9$, indicates a perspective view of docks and various buildings, with a sky as a background. The modified area may exhibit lighter portions $C^{19}$ (representing fronts of buildings), darker portions, $C^{29}$ (representing shaded sides of buildings or other shaded portions) and a sky or other background $C^{39}$. The surface modification may be effected (either alone or as an addition) by openings, as $C^{49}$ (shown as windows), these openings to be lighted, if desired, as hereinafter described, or an illusion of window or other lighting may be assured by the application of tinsel or other reflecting material to the screen. The modification of the surface may be by a stationary portion or by a movable portion, and the surface portion may bear a light or a simulation of a light. As before stated, the modification may be effected by lighter portions ($C^{19}$) or by shaded or darker portions ($C^{29}$). It may also be effected by having one or more portions of the exhibition-surface colored or tinted; thus (considering Fig. 2) (1) a portion, such as $C^{10}$, may be tinted green to represent a river, (2) the sky or other background ($C^{39}$) may be appropriately colored or tinted, as blue or yellow or the background may have a part or parts contrasting in color, tint, or shade with one or more other parts, (3) the lighter portions ($C^{19}$) may be colored or tinted in like or unlike colors or tints, and (4) the darker or shaded portions ($C^{29}$) may also be colored or tinted in like or unlike colors or tints. Modification may also be assured by painting window or other portions ($C^{49}$) to represent illumination.

Any modification of a screen should not, of course, be haphazard, but is to be worked out in accordance with a plan or scheme preferably determined at the time the photographs are taken. It is to be borne in mind that a treated screen (as $C^1$, Fig. 2) is intended, when a picture is afterward projected thereon, to have the treated or modified portion or portions merge with or change the appearance of that projected picture.

The treated screen may be the only screen employed, or it may be a supplementary screen—one additional to the usual untreated screen. Fig. 1 shows a movable screen, A, which has not been treated, and a supplementary treated screen $C^1$, directly behind A. Such last-mentioned screen is shown as movably supported in a frame of which upper and lower members (H and H') are diagrammatically illustrated. The frame is slidably carried (forwardly and rearwardly) upon a second frame, a member (rail) F of which is shown in the drawings. Said second frame is adapted to be slid crosswise of the stage or platform, wheels (as G) rolling upon rails (Z) being provided for that purpose. By the arrangement and combination outlined, it is possible to project a picture (from a lantern or projecting machine B) either directly on to a front screen, A, or onto a supplementary screen C'. When a front screen (as A) is not in use, the supplementary screen C', may be pushed forward (by moving the frame along the track F) to the position formerly occupied by the front screen.

A plurality (C', $C^2$, $C^3$, etc.,) of supplementary screens may be used, and all carried by the same frame or otherwise retained in spaced relation.

The several supplementary screens may (according to predetermination) be used successively during the projection of the same picture to widely modify the display of that picture, or each screen may be used only to modify a single picture. Each supplementary screen may be separately slid in the frame, so as to be removed from the latter or sufficiently to move such screen out of the field of the rays X.

In carrying out the new method of displaying a picture, use may be made of any form of lantern or projecting-machine B. A picture may be thrown, as shown in Fig. 1, upon the usual, or first screen A, and, upon withdrawal of that screen, the projection of the picture may be continued—as shown in Fig. 3—on the modified or supplementary screen C'. The modification of the latter will merge with the projected picture and cause a change in the appearance of the latter. Upon withdrawal of the screen C', the projection of the picture may be continued upon the next screen $C^2$, causing a further change in the appearance of the picture. The successive screens C', $C^2$, $C^3$, may have their surfaces differ from one another widely, or may be somewhat alike. For instance, the surfaces of screens C' and $C^2$ may differ from one another only in color or tint; or the difference may consist in the omission from one screen of a detail intentionally provided on the other, or in having, on one screen, a detail, which in size, or shape or position differs from that on the other screen. A detail provided upon a screen may be entirely absent from the scene originally photographed, and not appearing upon the picture film: in such case, the picture may first be thrown upon a screen A, that screen may be withdrawn, and the projection of the picture continued upon the screen (as C') which has the added detail. Conversely, a screen (as C') may be modified so as to omit or vary a detail of a scene originally photographed.

The changes in appearance of a picture during its projection, will depend, as will be understood, upon the modification or treatment of the surface of a screen. Thus, assuming as one instance, that the desired change in the appearance of a picture is to consist in seeming to illuminate a building, the window representations ($C^{49}$, as in Fig. 2) may either be openings through the screen, or may be of light-reflecting material applied to the screen; in the first case, a stationary or a movable lamp behind the screen will illuminate the window elements, while, in the second case, the rays of light from the projecting machine will be reflected from the window elements; in either event, the illumination or the appearance of illuminating a picture will be superior to and brighter than a mere white or colorless representation of a light as usually projected upon a screen. The representation of the building may be entirely absent from the film, or from any other screen employed while displaying the picture particularly mentioned. Assuming, as another instance, that the desired change in appearance is that one or more parts shall differ in color; in such case, a picture, without color, may first be projected upon the unmodified screen A, and continued (after withdrawal of that screen) onto the screen C' having, as in Fig. 2, a background ($C^{39}$) sky-colored or otherwise differing in color from other parts of the exhibition-surface. The picture will then be exhibited in colors. During the projection of a colored picture the colors thereof may be changed, upon the quick removal of one colored screen (C') and continuing the projection upon another screen (C²) which differs in color or arrangement of colors from that first mentioned. Thus, for instance, the sky background may be blue on one screen and may be green, yellow or red, or parti-colored, on another screen.

Change of color or shade, of a picture during its projection, may also result from the use of several modified screens each of which has all light parts (as $C^{10}$ and $C^{19}$) of the same tint or color, and all other darker or shaded parts, formed thereon, of the same tint or color. Thus, screen C' may have the lighter parts of white and the remainder of black; screen C² may have the lighter parts of blue and the remainder of black; screen C³ may have the lighter parts of red and the remainder of black. In such a case, a picture thrown upon screen C' might have the appearance of a day picture; when continued on screen C², the picture would resemble a "night picture;" and when further continued on screen C³, the picture would resemble a "fire picture."

Again, change of color or shade during projection may be secured by the arrangement illustrated in Fig. 3, especially when the exhibition-surface is parti-colored—having, for example, a yellowish sky (at $C^{39}$), the buildings being shown as red, and the foreground, representing water shown as light green. If now a colored transparent screen, D, be placed in the path of the light from a picture, or film, and from B, the colors or some of them, on the modified screen will be modified or changed—in the example just mentioned, the sky would be changed to green, the color of the buildings would become purple, and the foreground (water) would show as dark green.

In some instances, it may be desired to change but one, two or any number less than all of the colors. This may be assured by having the color or colors of the shutter (as D), or of the film itself, homologous with one or more of the colors or tones of the screen, and, therefore, having little or no effect perceptible by the eye, on such color or colors.

In using a modified screen, the picture may be projected upon the entire exhibition-surface or only upon a portion thereof; for instance, the moving or consecutive-view picture may be projected only upon the foreground ($C^{10}$), as in Fig. 2.

The method invented by me is especially useful in making and projecting the so-called "night pictures." It is well known that there must be an extremely long exposure in order to take even a still picture at night, and that it is impossible to take moving pictures at night. Because of this, "night pictures," especially moving or consecutive-view pictures, have been taken in the daylight, and shown by colored light, the film being tinted or dyed a bluish color. It has been found that the shadows and lights of such a "night" picture do not, however, truly simulate the shadows and lights of a night scene. To overcome this, I modify portions of the exhibition-surface of a supplementary screen, for instance either deepening or "fading out" shadows or lights as desired, by providing cloud, or moon, effects, etc., and the pictures are afterward thrown on such a screen. The "night" effect may be heightened or attained by dyeing or tinting the film wholly or in part, or by using a tinted supplementary screen, or by passing the light through a tinted or colored screen, as D in Fig. 3.

The combinations or arrangements of parts outlined in the accompanying drawings, are given as examples only. It is to be understood that my new method may be practised by the aid of any suitable devices, and may be used for the display either of still pictures or of consecutive-view pictures.

What I claim and desire to secure by Letters Patent is:—

1. The method of displaying pictures, consisting in providing a screen with an incomplete picture thereon, and projecting a moving picture on the screen to complete the incomplete picture, the moving picture interfitting with the incomplete picture on the screen.

2. The method of displaying pictures, consisting in providing a screen with an incomplete scene having a predetermined background, and a portion of its surface left blank, and interfitting a picture, projected on the blank portion of the screen, to complete the scene.

3. A screen to receive projected pictures, having an incomplete scene thereon, and a blank portion on which supplementary pictures may be projected to complete the scene.

4. The method of displaying pictures, consisting in providing a screen with an incomplete scene with a predetermined background and an adjacent blank surface, and projecting interfitting supplementary pictures on the blank portion of the screen, and illuminating the fixed scene on the screen by a separate source of light.

In testimony whereof, I have signed my name to this specification in the presence of two subscribing witnesses.

LANGDON McCORMICK.

Witnesses:
ISAAC HYMAN,
PETER S. RYAN.